US007092862B2

(12) United States Patent
Hooks

(10) Patent No.: US 7,092,862 B2
(45) Date of Patent: Aug. 15, 2006

(54) APPARATUS AND METHOD FOR DETERMINING WHETHER OBJECTS WILL COLLIDE

(75) Inventor: Charles Gordon Hooks, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 10/313,324

(22) Filed: Dec. 5, 2002

(65) Prior Publication Data

US 2004/0111245 A1 Jun. 10, 2004

(51) Int. Cl.
 G06G 7/48 (2006.01)
(52) U.S. Cl. ....................................................... 703/7
(58) Field of Classification Search ................. 703/7
 See application file for complete search history.

(56) References Cited

U.S. PATENT DOCUMENTS

| 4,578,757 | A | 3/1986 | Stark | 364/461 |
| 4,862,373 | A | 8/1989 | Meng | 364/444 |
| 5,268,995 | A | 12/1993 | Diefendorff et al. | 395/122 |
| 5,812,138 | A | 9/1998 | Devic | 345/422 |
| 6,002,973 | A | 12/1999 | Giegold | 701/35 |
| 6,004,016 | A | 12/1999 | Spector | 364/167.02 |

OTHER PUBLICATIONS

Chih-Hao Ho et al., "Efficient Point-Based Rendering Techniques for Haptic Display of Virtual Objects", Presence, vol. 8, No. 5, Oct. 1999, 477-491, Massachusetts Institute of Technology.*
Collision Detection, APGSoftware, http://web.archive.org/web/20010904081203/http://www.apgsoftware.co.uk/gl/collide.html.*
Ming C. Lin et al. "Collision detection between geometric models: a survey",Proceedings of the Institute of Mathematics and its Applications (IMA) Conference on Mathematics of Surfaces, pp. 25-32, 1998.*

* cited by examiner

Primary Examiner—Hugh Jones
(74) Attorney, Agent, or Firm—David A. Mims, Jr.; Rudolf O. Siegesmund

(57) ABSTRACT

A computer program for determining whether a plurality of objects will collide is disclosed. The program divides each object into surfaces, subsurfaces, and elements and computes normals for the elements and normals for each subsurface. The program calculates the dot products between the subsurface normals. If the dot product is negative, the program computes the relative subsurface vector between the two subsurfaces and calculates the dot product between the first subsurface normal and the relative subsurface vector to determine if there is a possible collision of elements. If that dot product is negative, then the program calculates the dot product for the elemental normals. If that dot product is negative, then the program calculates the relative elemental vector and calculates the dot product between the first elemental normal and the relative elemental vector. If that dot product is negative, then the two objects have collided.

6 Claims, 5 Drawing Sheets

APPARATUS AND METHOD FOR DETERMINING WHETHER OBJECTS WILL COLLIDE

FIELD OF THE INVENTION

The present invention is related to methods for determining whether a plurality of complex three-dimensional objects will collide with one another.

BACKGROUND OF THE INVENTION

Robotic and automated processes are well known in the art. In manufacturing industries, automated processes are used to manufacture everything from automobiles to computer circuit boards. When designing an assembly line in a manufacturing process, it is often desirable to create a computer model of the manufacturing line and processes prior to actual construction. To this end, computer aided drafting (CAD) has been an invaluable tool. CAD allows a draftsperson to create a three-dimensional computer model of a manufacturing line, including the processes and the various machines required to implement those processes. However, CAD is limited in that it does not depict dynamic processes with great precision or accuracy. In other words, the CAD software has problems depicting the dynamic movement of the machines in the manufacturing environment and even greater problems determining if the various machines will collide with one another. Moreover, when multiple dynamic processes are implemented, the processing capacity and memory required to simulate the dynamic manufacturing process is often prohibitive.

In large manufacturing environments, like automobile manufacturing, there is usually sufficient space to give each robotic machine its own working radius such that it is impossible for one machine to collide with the other machines. FIG. 1 is a plan view illustration of such a manufacturing environment. In FIG. 1, the manufacturing line is depicted running left to right through four manufacturing processes. Each process comprises at least one arm which has a working radius. The working radius is defined as the maximum extendable reach of any one machine. The working radius of a machine is usually, but not necessarily, cylindrical or spherical, depending on the type of machine. The working radii are specific to each machine and may differ from one machine to another. In FIG. 1, the working radii of the various machines do not overlap, thus it is impossible for the arm of any one machine to physically collide with the arm of any other machine.

However, when space is limited or the manufactured device is smaller, as in circuit board manufacturing, the individual machines must be closer together so that the working radii overlap. FIG. 2 is a plan view illustration of a manufacturing line running left to right with ten machines accessing the line. Because it is very undesirable for the machines to physically collide with one another, the manufacturing process layout must be designed such that the individual machines are able to freely move about and perform their individual processes, yet not collide with or impede the processes of the other machines. Thus, a computer program must determine where the arm of each machine will be at a given time and arrange the processes so that the arms of the machines never attempt to occupy the same space at the same time.

To further complicate the matter, the individual machines are not usually of the same height, a quality not illustrated in FIG. 1 or 2. The differing height allows the machines to be placed even closer together so that the manufacturing line can be even further shortened. Thus, it is possible for the arm of one machine to be physically above the arm of another machine and yet the two arms will not collide. The addition of a third dimension of analysis to the design layout problem makes the solution extremely computationally intensive given traditional methods of analysis.

Automated processes are also used in environments other than manufacturing. For example, automated processes are frequently used to unload cargo from the space shuttle. FIG. 3 is an illustration of the space shuttle with the robotic arm. Because it is very desirable to avoid collisions between the cargo and the shuttle during unloading, the unloading algorithm for the robotic arm is pre-programmed so that the astronauts do not have to manually control the robotic arm. Automated unloading instructions allow the astronauts more time to perform other tasks and decrease the likelihood of damaging the shuttle or the cargo. A similar algorithm can also be used to determine if a collision will occur between any two objects in a multitude of other environments. For example, is advantageous to know if two objects will collide in air traffic control industry (i.e. to prevent collisions). It is also important to know if two objects will collide when developing programming software for missile defense systems (i.e. to ensure a collision). Therefore, a need exists for a computationally efficient method of determining whether a plurality of objects will collide.

The prior art has frequently addressed the problem of determining whether two objects will collide. U.S. Pat. No. 5,812,138 entitled "Method and Apparatus for Dynamic Object Identification After Z-Collision" discloses a method of determining if two three-dimensional objects have collided in three-dimensional space. The method disclosed in the '138 patent maps out the surface of a plurality of three-dimensional objects and determines if they collide. While the surface mapping technique disclosed in the '138 patent is useful for simple three-dimensional objects, it becomes computationally intensive for complex three-dimensional objects because the computer has to recalculate the location of every pixel for every time interval to determine if the two objects have collided. Thus, a less computationally intensive model is needed to determine if two complex three-dimensional objects will collide.

U.S. Pat. No. 6,004,016 entitled "Motion Planning and Control for Systems with Multiple Mobile Objects" discloses a computational method for generating movement paths and avoiding collisions amongst a plurality of jointed robot assembly arms. The method disclosed in the '016 patent involves defining the three-dimensional space around the manipulator arms in terms a multiplicity of cells and defining the movement of the arm in terms of the cells that the arm occupies at a given time. By knowing which cells are occupied by the arms at a given time, you can determine if more than one arm is attempting to occupy a cell at any given time and, thus, whether the arms will collide. Unfortunately, in close assembly situations like circuit board manufacturing, the method in the '016 is not very practical because the various assembly machines work in extremely close proximity to each other and thus the cells size would have to be very small. Use of smaller cell sizes significantly increases the number of computations resulting in a computationally intensive computer program. Therefore, a need exists for a different method of determining whether two separate three-dimensional bodies will collide.

U.S. Pat. No. 4,578,757 entitled "Method for Preventing Collision of Two Mutually Movable Bodies and an Apparatus Including an Arrangement for Preventing Collision"

discloses a method of determining if two complex three-dimensional bodies will collide. The method disclosed in the '757 patent defines the two objects in terms of numerous spheres. The spheres completely encase the objects; however the objects do not completely fill the spheres. A computational method is then disclosed for determining if any of the spheres intersect. The sphere method inherently overcompensates for the displacement of flat surfaces by creating a series of hemispherical subsurfaces not occupied by the object. This hemispherical space can be reduced by creating additional spheres; however this in turn increases the number and intensity of the computations. Therefore, a less computational intense method of determining whether two complex three-dimensional bodies will collide is needed.

Consequently, a need exists for a more computationally efficient method of simulating dynamic movement of a plurality of complex three-dimensional objects. A need further exists for a method of determining if a plurality of moving complex three-dimensional objects will collide with other moving complex three-dimensional objects. Additionally, the need extends to an apparatus and method that is less computationally intensive than the prior art solutions.

SUMMARY OF THE INVENTION

The present invention is a computer program that determines if and when a plurality of objects will collide. The user specifies the shape, orientation, initial position, and path of each object. The collision detection program then divides each object into surfaces, subsurfaces, and elements, and computes normal vectors for the elements. The elemental normals are used to calculate normals for each subsurface. The collision detection program calculates the dot products between the subsurface normals to determine if there is a possibility of subsurface collision. When calculating the value of a dot product, the value of the dot product is negative when the surfaces are facing each other or facing away from each other and the value of the dot product is positive when the surfaces are facing in the same direction. If the value of the dot product between two subsurface normals is negative, the collision detection program calculates the relative subsurface vector from the first subsurface to the second subsurface and calculates the dot product between the first subsurface normal and the relative subsurface vector to determine if there is a possible collision of elements. If the value of that dot product is negative, then the collision detection program calculates the dot product for the elemental normals. If the value of that dot product is negative, then the collision detection program calculates the relative elemental vector from the first elemental normal to the second elemental normal and calculates the dot product between the first elemental normal and the relative elemental vector. If the value of that dot product is negative, then the two objects have collided.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 4:
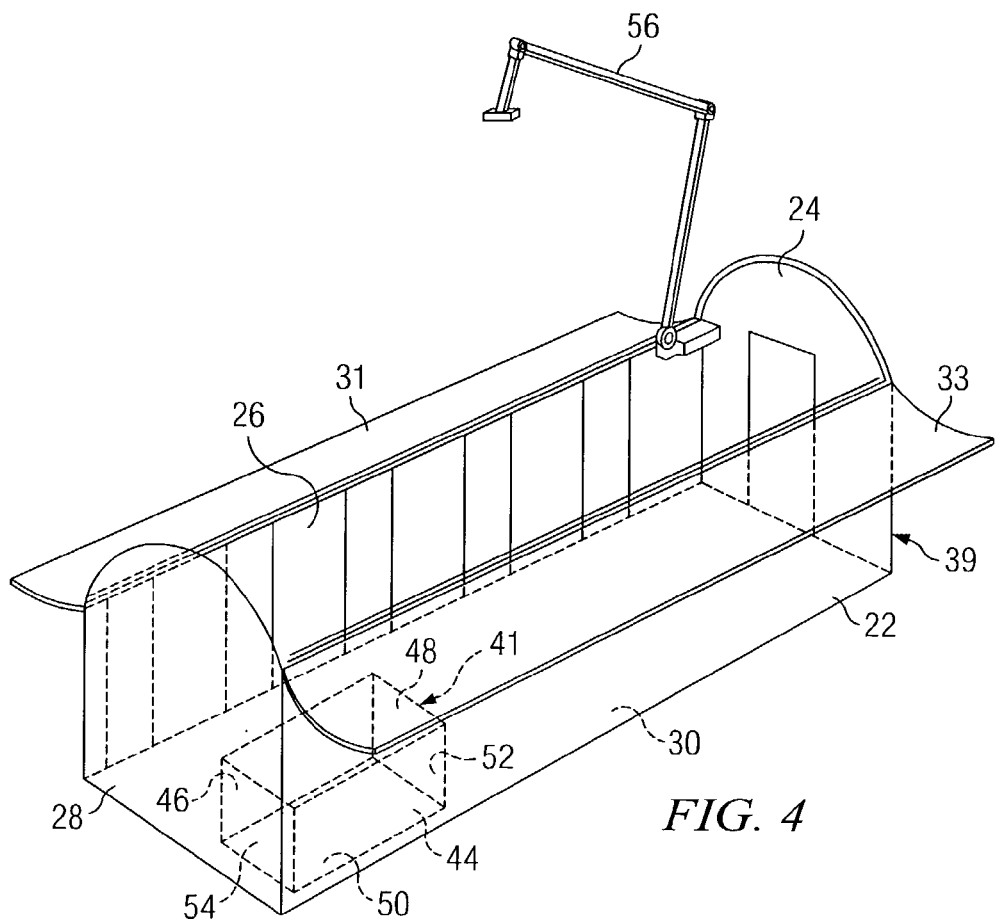
FIG. 4 is a transparent prospective view of the cargo bay of the space shuttle showing the robotic arm and a piece of cargo.

FIG. 4 is a transparent prospective view of the cargo bay of the space shuttle showing the robotic arm and a piece of cargo. One of the objects of the present invention is to provide a computationally efficient algorithm for unloading cargo 41 from cargo bay 39. Cargo 41 is box-like in shape and has six exterior walls: top 48, bottom 50, side 44, side 46, side 52, and side 54. Cargo bay 39 comprises five interior walls: bottom 30, side 24, side 26, side 28, and side 22. In addition, the shuttle contains cargo bay door 31 and door 33. Arm 56 is located within cargo bay 56. The present invention provides an algorithm for using arm 56 to remove cargo 41 from cargo bay 39 without collisions between arm 56, cargo 41, cargo bay 39, door 33, or door 31.

Figure 5:
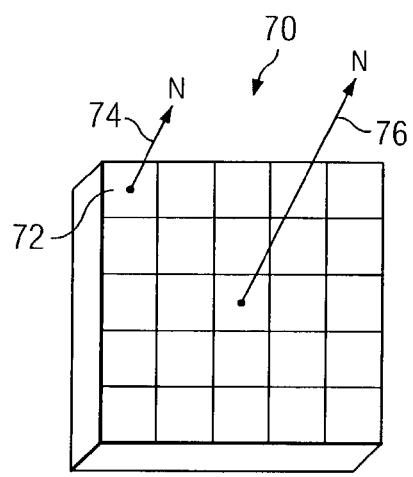
FIG. 5 is an illustration of the subdivision of a flat subsurface of an object into elements, the normal for an individual element, and the subsurface normal.

The present invention involves the division of objects into subsurfaces and elements. An object is defined as an individual item, whether freely movable or fixed. Each object has a number of exterior surfaces, which may be flat or curved. In the case of objects with flat surfaces, a subsurface is defined as the flat surface of the object bordered by the edges. Therefore, if the object is a box-like structure such as cargo 41, the object would have six subsurfaces: top 48, bottom 50, side 44, side 46, side 52, and side 54. Similarly, cargo bay 39 has five subsurfaces: bottom 30, side 24, side 26, side 28, and side 22. These subsurfaces are further broken down into elements. FIG. 5 is an illustration of the division of subsurface 70 divided into a plurality of elements 72. The size of the individual elements will determine the number of elements for a given subsurface and is an important consideration. Smaller elements produce a more accurate representation of the subsurface, and therefore the object. However, smaller elements may increase the number of computations involved in the present invention, particularly when the objects operate in close proximity to one another.

For each element, a normal vector can be calculated. A vector is defined as a three-dimensional variable that has a direction. Vectors are traditionally depicted as an arrow with the length of the arrow indicating the distance and the orientation of the arrow indicating the direction. A normal is defined as the vector orthogonal (perpendicular) to a surface, subsurface, or element, pointing outwardly from the surface, subsurface, or element. Normals described in conjunction with the present invention are unit normals. In other words, the normals only indicate a direction, not a length or magnitude. In the present invention, a normal is computed for each individual element. In FIG. 5, normal 74 is the normal vector for element 72. If the subsurface is flat, the normals of the individual elements will be parallel. The normals for all of the elements can be averaged together to produce an average normal for the subsurface. In FIG. 5, normal 76 is the normal for subsurface 70. By dividing all of the flat surfaces of an object into subsurfaces and further dividing the subsurfaces into elements, normal vectors can be calculated for the elements, and consequently normals can be calculated for the subsurfaces of the entire object.

Figure 1:
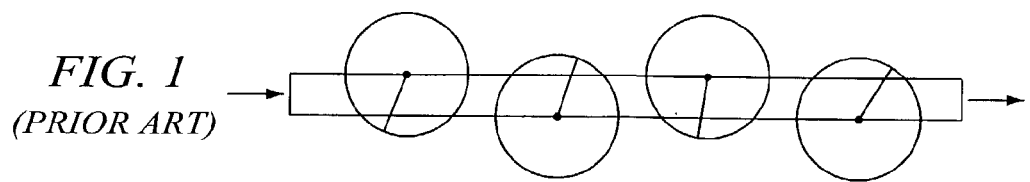
FIG. 1 is a plan view illustration of a manufacturing line without overlapping working radii.
Figure 2:
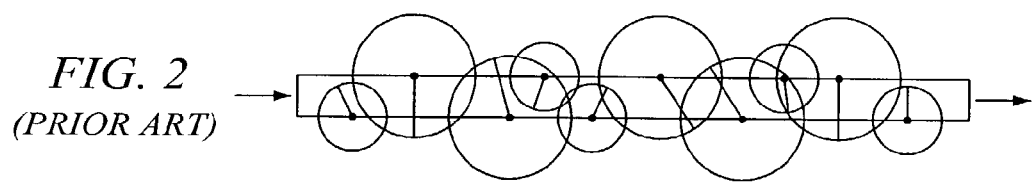
FIG. 2 is a plan view illustration of a manufacturing line with overlapping working radii.
Figure 3:
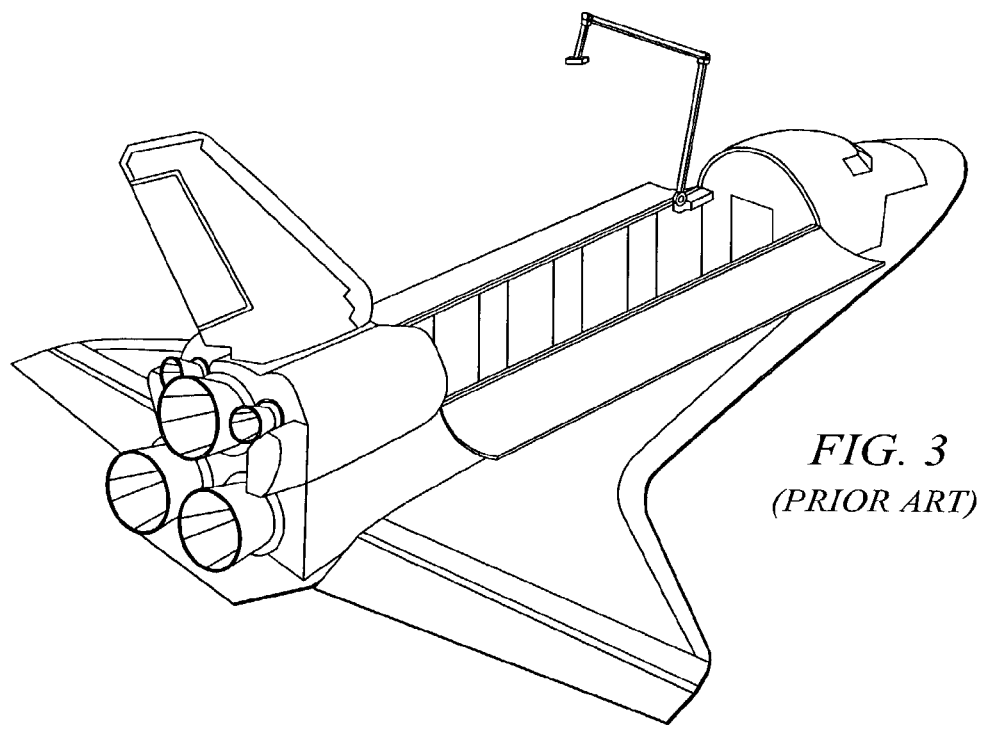
FIG. 3 is a prospective illustration of the space shuttle with the robotic arm.
Figure 6:
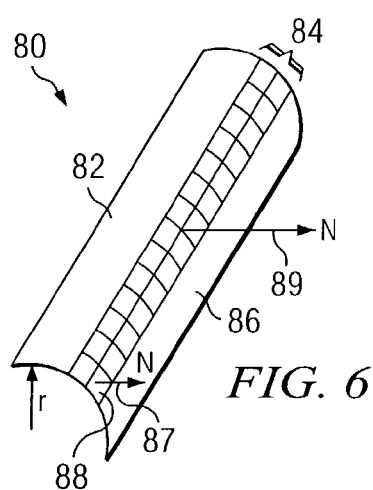
FIG. 6 is an illustration of the subdivision of a curved surface of an object into subsurfaces and elements, the normal for an individual element, and the subsurface normal.

For objects that contain curved surfaces, the surface of the object can still be divided into elements. However, the curvature of the surface results in elemental normals which are not parallel. Therefore, the curved surface is divided into subsurfaces. For curved surfaces, a subsurface is defined as the area bordered by the edges of the surface and only containing elements with elemental normals that are within 15° of the normal for the subsurface. For example, FIG. 6 is an illustration of a portion of the exterior of a cylinder with exterior radius r. Surface 80 is similar to the cargo bay doors of the space shuttle depicted in FIG. 3 and FIG. 4. Because surface 80 is one quarter of a cylinder, there is a 90° difference in between the normal vectors on the top edge and the side edge of surface 80. Limiting the subsurfaces to a 15° variation from the subsurface normal will divide surface into three subsurfaces: subsurface 82, subsurface 84, and subsurface 86. Each subsurface can then be broken down into elements, such as element 88 in subsurface 84. Normal 87 is the normal vector for element 88 and will be within 15° of normal 89, which is the normal for subsurface 84. By limiting the variance of the elemental normals to 15° of the subsurface normals, the maximum variation between two elemental normals in a subsection will be 30°. The limitation on the elemental variance is also an important consideration as decreasing the amount of the variance will result in a more accurate representation of the subsurface, and therefore, the surface of the object. However, decreasing the variance will also increase the number of subsurfaces, thereby possibly increasing the number of calculations inherent in the present invention. The variance may best be selected by persons skilled in the art.

Figure 7:
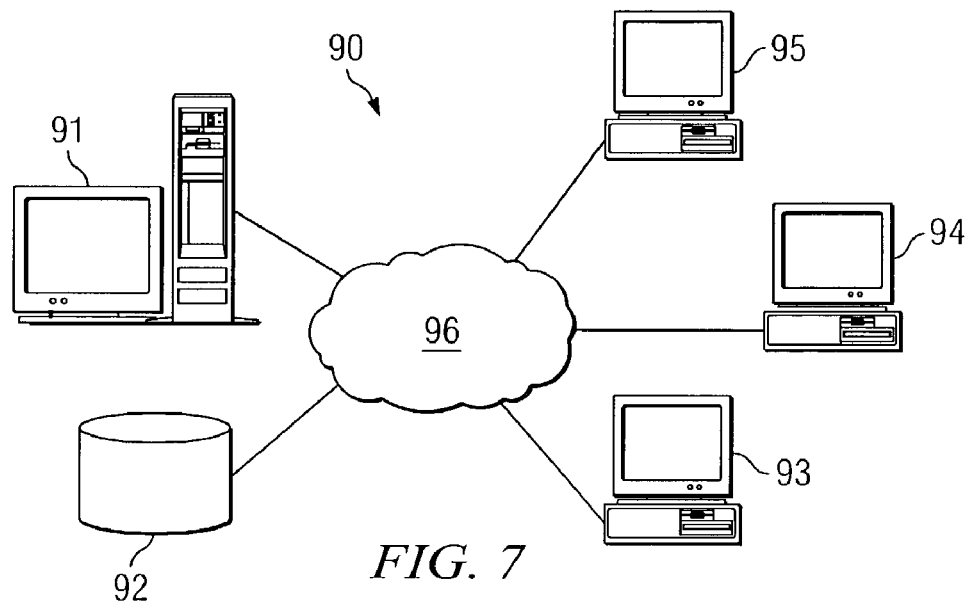
FIG. 7 is an illustration of a computer network used to implement the present invention.

FIG. 7 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 7 is intended as a representation of all possible operating systems that may contain the present invention and is not meant as an architectural limitation.

Figure 8A:
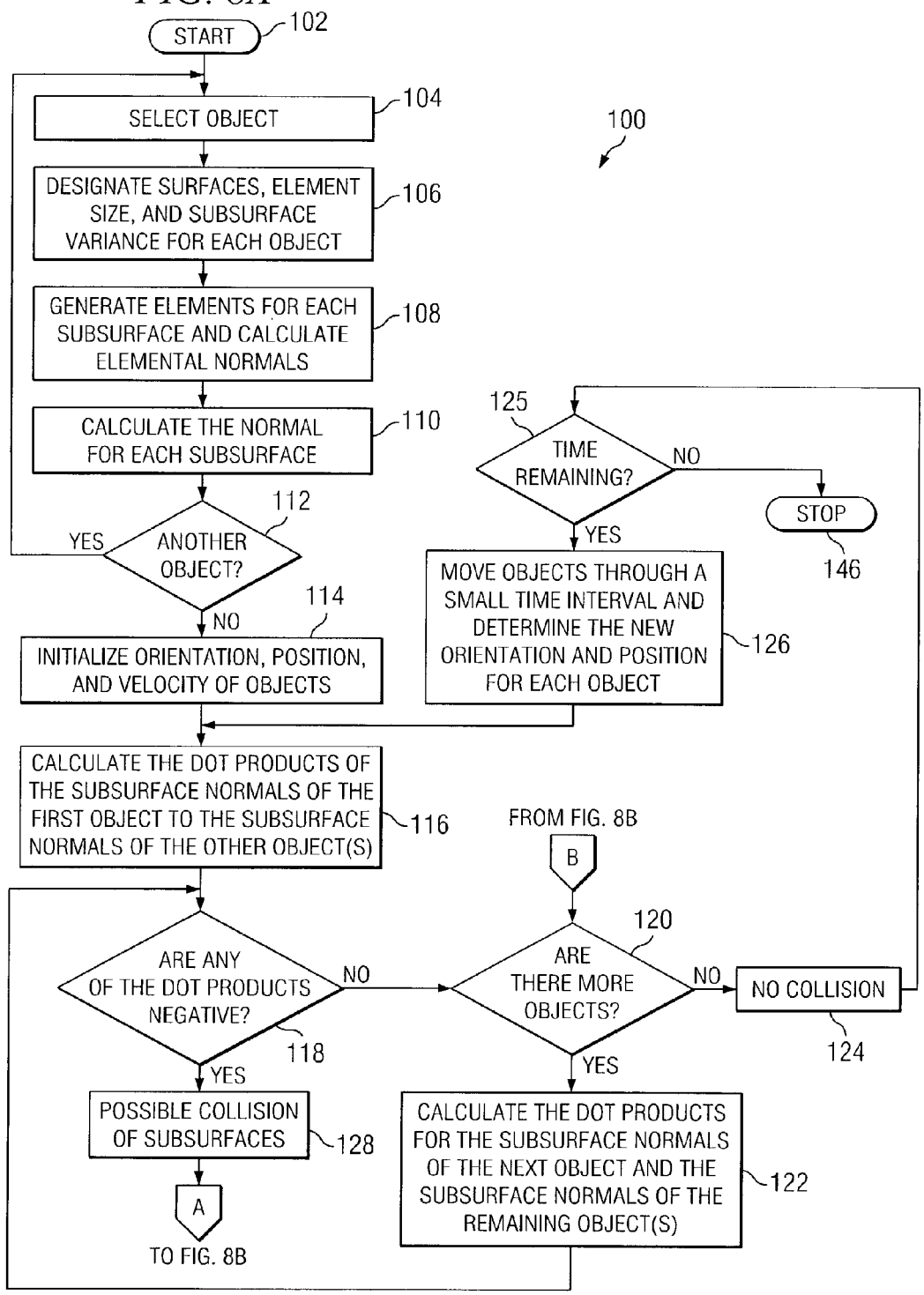
FIGS. 8A and 8B are flowsheets of the logic of the present invention.
Figure 8B:
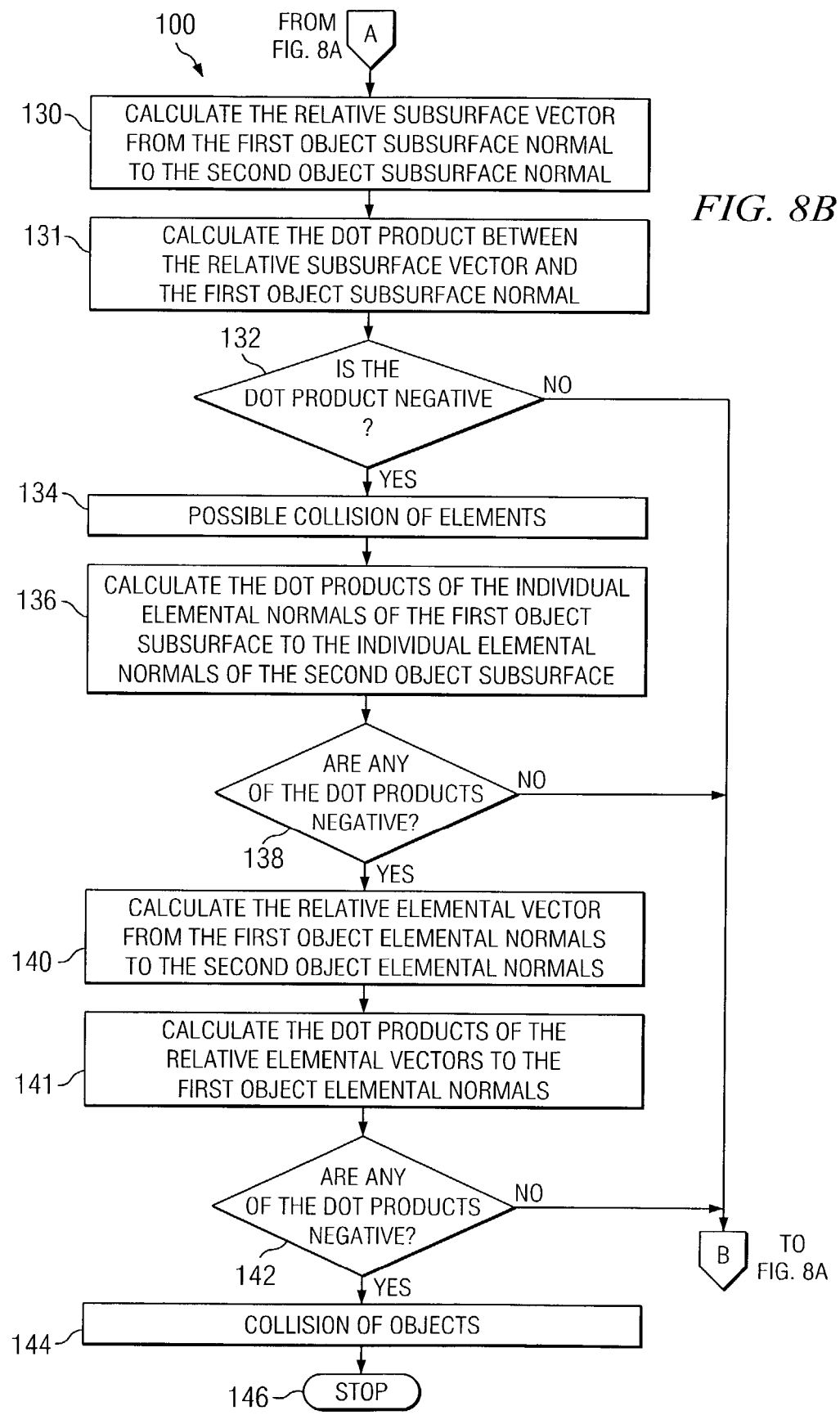

FIGS. 8A and 8B are flowsheets of the logic of the collision detection program 100 of the present invention. Collision detection program 100 starts (102) and the user selects and object to define (104). In selecting an object, the user selects an object from a list of a plurality of objects that have been previously specified. In other words, the shape of the objects have been defined such that the computer can determine how many surfaces are on the object, what the shape of the object is, and if the object has flat or curved surfaces. Moreover, the initial position, orientation, and velocity of the object are specified as well as some formula or other means for predicting the movement of the object in three-dimensional space as time progresses. Persons skilled in the art are aware of various methods of entering these types of data into a computer. The user then defines the object by designating the surfaces (i.e. identifying which surfaces he desires to perform the present collision analysis on), the size of the elements, and the variance for the curved surfaces of the object (106). Collision detection program 100 then calculates the elements for each subsurface of the object based on the element size specified in step 106 and calculates the normals of each element (108). Collision detection program 100 then calculates the normal for each subsurface based on the elemental normals obtained in step 108 (110). The user is then queried whether there is another object (112). If there is another object, collision detection program 100 returns to step 104. If there is not another object, collision detection program 100 proceeds to step 114.

Figure 9:
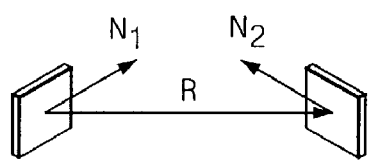
FIG. 9 is a prospective illustration of the surfaces of two different objects, their subsurface normals, and the relative vector between the two surfaces.
Figure 10:
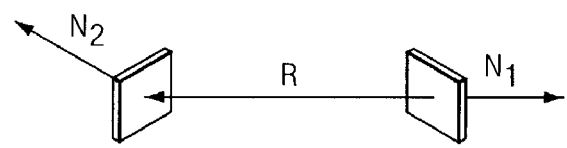
FIG. 10 is a prospective illustration of the subsurfaces of two different objects, their subsurface normals, and the relative vector between the two surfaces.
Figure 11:
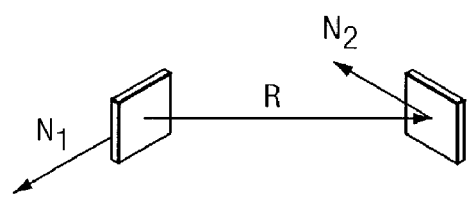
FIG. 11 is a prospective illustration of the subsurfaces of two different objects, their subsurface normals, and the relative vector between the two surfaces.

Collision detection program 100 then initializes the orientation, position, and velocity of the objects (114). In other words, collision detection program 100 positions the objects in their initial position in three-dimensional space as specified by the user. Collision detection program 100 then calculates the dot products of the subsurface normals of the first object with the subsurface normals of the other object(s) (116). The dot product is a method of multiplying two vectors which results in a scalar product. Persons skilled in the art are aware of methods for calculating the dot product between two vectors. When the two vectors are pointing towards each other, as seen in FIG. 9, their dot product will yield a negative number. When the two vectors are pointing away from each other, as seen in FIG. 10, their dot product will yield a negative number. When two vectors are pointing in the same direction, as seen in FIG. 11, their dot product will yield a positive number. When two vectors are orthogonal to each other, their dot product will be zero.

Returning to FIG. 8A, collision detection program 100 makes a determination whether any of the dot products calculated in step 116 or step 122 are negative (118). If none of the dot products are negative, then collision detection program 100 makes a determination if there are more objects left to analyze (120). If there are only two objects specified by the user, then the two objects are analyzed in step 116. However, if there are three or more objects specified, then multiple iterations of object analysis similar to step 116 are required and therefore, collision detection program 100 determines that there are more objects at step 120. In other words, if there are three objects, step 116 analyzes possible collisions between the first and second object, between the first and third object, and between the second and third object. If the user is certain that two objects will never collide, the user can restrict these combinations in order to further decrease the overall processing time. It is to this extent that collision detection program 100 determines if there are more objects for analysis in step 120. If there are more objects for analysis in step 120, then collision detection program 100 calculates the dot products for the subsurface normals of the next object and the subsurface normals for the remaining objects (122). The calculation in step 122 is similar to the calculation in step 116. Collision detection program 100 then returns to step 118.

If collision detection program determines that there are not any more objects at step 120, then collision detection program 100 indicates that a collision will not occur (124). Collision detection program 100 then determines if any time still remains (125). If no time remains, then collision detection program ends (146). If time remains at step 125, then collision detection program 100 moves all of the objects through a small time interval and determines the new orientation and position for each object (126). Because a predictive movement algorithm was specified for each object, the object path can be predicted at any given time. Collision detection program 100 breaks the time into small user designated intervals and moves each of the objects through their individual algorithms according to the individual time increments. The length of the time interval in step 126 is best determined by persons skilled in the art. If the objects do not collide during any of the incremental time periods, then they do not collide. Collision detection program 100 then returns to step 116.

Returning to step 118, if there is a negative dot product obtained form the calculation in step 116 or step 122, then there is a possible collision of subsurfaces (128). Collision detection program 100 then calculates the relative subsurface vector from the first object subsurface normal to the second object subsurface normal (130). The relative subsurface vector is the vector from the base of the first object subsurface normal to the base of the second object subsurface normal. FIG. 9 is an illustration of two surfaces with their subsurface normals $N_1$ and $N_2$. The relative subsurface vector is vector R, which extends from the first subsurface to the second subsurface. As the two surfaces approach each other, R will become smaller and smaller, eventually approaching zero when the two surfaces collide. If the two surfaces were able to pass through one another, R would point in the opposite direction towards the normal of the second subsurface, as seen in FIG. 10. FIG. 11 is an illustration of two surfaces traveling in the same direction.

Returning to FIG. 8B, collision detection program 100 then calculates the dot product between the relative subsurface vector and the first object subsurface normal (131). Collision detection program 100 then makes a determination whether the dot product calculated in step 131 is negative (132). If the dot product is not negative, then collision detection program 100 returns to step 120. If the dot product obtained in step 130 is negative, there may be a possible collision of elements (134). Collision detection program 100 then calculates the dot products of the individual elemental normals of the first object subsurface to the individual elemental normals of the second object subsurface for all combinations of elements to determine which elements have collided (136). Collision detection program 100 then makes a determination whether any of the dot products obtained in step 136 are negative (138). If the dot product is not negative, collision detection program 100 returns to step 120. If the dot product is negative, then collision detection program 100 calculates the relative elemental vectors from the first object elemental normals to the second object elemental normals (140). The relative elemental vectors are defined as the vector from the base of the first elemental normal to the base of the second elemental normal. Relative elemental vectors are similar to the relative subsection vectors seen in FIG. 9 and FIG. 10.

Returning to FIG. 8B, collision detection program 100 calculates the dot products between the relative elemental vectors and the first object elemental normals (141). Collision detection program 100 then makes a determination whether any of the dot products obtained in step 141 are negative (142). If none of the dot products are negative, collision detection program 100 returns to step 120. If any of the dot products obtained in step 141 are negative, then collision detection program determines that the two objects will collide (144) and collision detection program 100 ends (146).

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A computer implemented process for simulating dynamic movement of two three-dimensional objects selected from a plurality of specified objects to determine whether the two three-dimensional objects will collide in a three-dimensional space comprising:
   using a computer having a memory and a collision detection program and the plurality of specified objects stored in the memory, performing the steps of;
   (a) responsive to a user selection of a first object and a second object from the plurality of specified objects;
   (b) designating a first object subsurface, a first object size, and a first object subsurface variance;
   (c) designating a second object subsurface, a second object size, and a second object subsurface variance;
   (d) calculating a first object subsurface normal for the first object subsurface;
   (e) calculating a second object subsurface normal for the second subsurface;
   (f) initializing a first object orientation, a first object position, and a first object velocity in the three dimensional space;
   (g) initializing a second object orientation, a second object position, and a second object velocity in the three dimensional space;
   (h) calculating a first dot product between the first object subsurface normal and the second object subsurface normal;
   (i) determining whether the dot product is negative; and
   (j) responsive to determining that the first dot product is negative, calculating a relative subsurface vector from the first object subsurface normal to the second object subsurface normal;
   (k) calculating a second dot product between the relative subsurface vector and the first object subsurface normal;
   (l) responsive to a determination that the second dot product is negative, calculating a third dot product of a first object subsurface individual elemental normal to a second object subsurface individual elemental normal;
   (m) responsive to a determination that the third dot product is negative, calculating a relative elemental vector from the first object elemental normal to the second object elemental normal;
   (n) calculating a fourth dot product of the relative elemental vector to the first object elemental normal; and
   (o) responsive to a determination that the fourth dot product is negative, providing a determination that the objects have collided.

2. The computer implemented process of claim 1 further comprising the step of:
responsive to a determination that the first object and the second object have not collided, moving the first object and the second object through a time interval and determining a new first object orientation, a new first object position, a new second object orientation, and a new second object position, and repeating steps (h) through (o).

3. A computer program product, tangibly stored in a computer readable medium for simulating dynamic movement of two three-dimensional objects selected from a plurality of specified objects to determine whether the two three-dimensional objects will collide in a three-dimensional space comprising:
instructions for causing a computer to perform the steps of:
(a) responsive to a user selection a first object and a second object from the plurality of specified objects;
(b) designating a first object subsurface, a first object size, and a first object subsurface variance;
(c) designating a second object subsurface, a second object size, and a second object subsurface variance;
(d) calculating a first object subsurface normal for the first object subsurface;
(e) calculating a second object subsurface normal for the second subsurface;
(f) initializing a first object orientation, a first object position, and a first object velocity in the three dimensional space;
(g) initializing a second object orientation, a second object position, and a second object velocity in the three dimensional space;
(h) calculating a first dot product between the first object subsurface normal and the second object subsurface normal;
(i) determining whether the dot product is negative; and
(j) responsive to determining that the first dot product is negative, calculating a relative subsurface vector from the first object subsurface normal to the second object subsurface normal;
(k) calculating a second dot product between the relative subsurface vector and the first object subsurface normal;
(l) responsive to a determination that the second dot product is negative, calculating a third dot product of a first object subsurface individual elemental normal to a second object subsurface individual elemental normal;
(m) responsive to a determination that the third dot product is negative, calculating a relative elemental vector from the first object elemental normal to the second object elemental normal;
(n) calculating a fourth dot product of the relative elemental vector to the first object elemental normal; and
(o) responsive to a determination that the fourth dot product is negative, providing a determination that the objects have collided.

4. The computer program product of claim 3, further comprising:
responsive to a determination that the first object and the second object have not collided, instructions for moving the first object and the second object through a time interval and determining a new first object orientation, a new first object position, a new second object orientation, and a new second object position, and repeating instructions (h) through (o).

5. A an apparatus for simulating dynamic movement of two three-dimensional objects selected from a plurality of specified objects to determine whether the two three-dimensional objects will collide in a three-dimensional space comprising:
a computer having a memory;
a collision detection program in the memory of the computer containing instructions to cause the computer to perform the action of:
(a) responsive to a user selection of a first object and a second object from the plurality of specified objects;
(b) designating a first object subsurface, a first object size, and a first object subsurface variance;
(c) designating a second object subsurface, a second object size, and a second object subsurface variance;
(d) calculating a first object subsurface normal for the first object subsurface;
(e) calculating a second object subsurface normal for the second subsurface;
(f) initializing a first object orientation, a first object position, and a first object velocity in the three dimensional space;
(g) initializing a second object orientation, a second object position, and a second object velocity in the three dimensional space;
(h) calculating a first dot product between the first object subsurface normal and the second object subsurface normal;
(i) determining whether the dot product is negative; and
(j) responsive to determining that the first dot product is negative, calculating a relative subsurface vector from the first object subsurface normal to the second object subsurface normal;
(k) calculating a second dot product between the relative subsurface vector and the first object subsurface normal;
(l) responsive to a determination that the second dot product is negative, calculating a third dot product of a first object subsurface individual elemental normal to a second object subsurface individual elemental normal;
(m) responsive to a determination that the third dot product is negative, calculating a relative elemental vector from the first object elemental normal to the second object elemental normal;
(n) calculating a fourth dot product of the relative elemental vector to the first object elemental normal; and
(o) responsive to a determination that the fourth dot product is negative, providing a determination that the objects have collided.

6. The apparatus of claim 5 further comprising:
responsive to a determination that the first object and the second object have not collided, moving the first object and the second object through a time interval and determining a new first object orientation, a new first object position, a new second object orientation, and a new second object position, and repeating steps (g) through (o).

* * * * *